United States Patent [19]

Powell

[11] Patent Number: 4,585,569

[45] Date of Patent: * Apr. 29, 1986

[54] HEAT PUMPS

[75] Inventor: Richard L. Powell, Winsford, England

[73] Assignee: Imperial Chemical Industries PLC, London, England

[*] Notice: The portion of the term of this patent subsequent to Sep. 17, 2002 has been disclaimed.

[21] Appl. No.: 685,781

[22] Filed: Dec. 24, 1984

[30] Foreign Application Priority Data

Jan. 4, 1984 [GB] United Kingdom ................ 8400098

[51] Int. Cl.$^4$ ............................................. C09K 5/04
[52] U.S. Cl. ........................................ 252/69; 62/112; 260/239 A; 546/184; 548/400; 548/579; 564/510; 570/141
[58] Field of Search .......................... 252/69; 564/510; 260/239 A; 546/184; 548/400, 579; 570/141; 62/112

[56] References Cited

U.S. PATENT DOCUMENTS

| | | | |
|---|---|---|---|
| 2,031,087 | 2/1936 | Zellhoefer | 62/112 |
| 2,348,321 | 5/1944 | Benning et al. | 564/510 |
| 2,691,043 | 10/1954 | Husted et al. | 564/510 |
| 3,134,816 | 5/1964 | Scott et al. | 564/510 |
| 3,407,232 | 10/1968 | Mitsch | 252/67 |

FOREIGN PATENT DOCUMENTS

| | | | |
|---|---|---|---|
| 73366 | 5/1982 | Japan | 62/112 |
| 388356 | 4/1933 | United Kingdom | 62/112 |

OTHER PUBLICATIONS

Keshtov et al., "Study of the Complexing of Phenols with Tertiary Amines in Aprotic Media," Izv. Akad. Nauk SSSR, Ser. Khim. 1980, (12), 2730–2734, (CA 94:120703).

Primary Examiner—Paul Lieberman
Assistant Examiner—Robert A. Wax
Attorney, Agent, or Firm—Cushman, Darby & Cushman

[57] ABSTRACT

An absorption heat pump wherein the working fluid is a fluoroalkylamine of the formula:

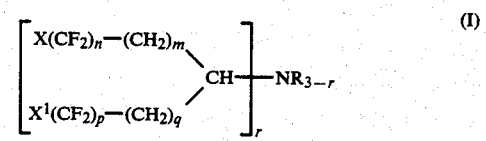

wherein each of X and $X^1$, independently, represents hydrogen or fluorine,
R represents hydrogen or a lower alkyl radical,
n represents an integer from 1 to 4, each of m and q represents an integer from 0 to 2,
p represents an integer from 0 to 4 provided that p is not zero when $X^1$ is fluorine, and r represents an integer from 1 to 3, the fluoroalkylamine having a maximum of 6 carbon atoms and the solvent is a phenol.

5 Claims, No Drawings

HEAT PUMPS

This invention relates to heat pumps of the absorption type and more particularly to working fluids for use therein.

Heat pumps which transfer heat from a low temperature zone to a higher temperature zone are well known. In the absorption type of heat pump, a fluid of suitable boiling point evaporates at low pressure taking heat from the surrounding lower temperature zone. The resulting vapour then passes to an absorber where it is absorbed in a solvent having a higher boiling point than that of the fluid. The solution so formed is then passed to a boiler or generator where it is heated to drive off the fluid as vapour, the hot solvent being returned by way of a heat exchanger to the absorber. As the fluid evaporates, the pressure developed is sufficient to cause it to condense in a condenser and thereby release heat to the higher temperature zone. The condensate is then returned through an expansion valve to the evaporator to complete the cycle.

The suitability of a material as a heat pump working fluid depends upon a number of factors. Thus, in addition to having a suitable boiling point, it must be generally acceptable in respect of toxicity, flammability and corrosivity. In an absorption type heat pump system, the solvent must also be satisfactory in these respects. Ideally, the boiling point of the solvent is as high as possible to minimise vaporisation and loss of solvent from the generator along with the working fluid. It is also important, in order to minimise the mass flow of solvent between absorber and generator and thereby limit the size of the solution heat exchanger required, that the working fluid and solvent should interact in such a way that the solution of the one in the other exhibits a negative deviation from Raoult's law, both components of the solution exerting a lower vapour pressure than would be expected having regard to the vapour pressures of the pure components. This situation arises when an affinity or attraction exists between the molecules of the working fluid and the solvent molecules, an affinity which can often be interpreted in terms of hydrogen bonding.

Materials that have been used as working fluids in absorption type heat pumps include ammonia, the solvent then being water. Other fluids proposed include fluorinated hydrocarbons such as monochlorodifluoromethane, 1-chloro-2,2,2-trifluoroethane and 1,1,1,2,-tetrafluoroethane. Solvents for use with these fluids include materials of a slightly basic nature capable of interacting with acidic hydrogen atoms present in the fluoro compounds. Whilst these fluids have been generally satisfactory for the purpose for which they were intended, they are less suitable for heat pumps operating with high lifts.

The present invention provides an absorption heat pump system wherein the working fluid is a fluoroalkylamine of the formula:

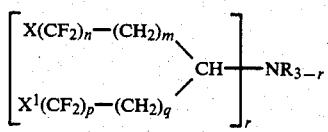

(I)

wherein each of X and $X^1$, independently, represents hydrogen or fluorine,

R represents hydrogen or a lower alkyl radical, n represents an integer from 1 to 4, each of m and q represents and integer from 0 to 2, p represents an integer from 0 to 4 provided that p is not zero when $X_1$ is fluorine, and r represents an integer from 1 to 3, the fluoroalkylamine having a maximum of 6 carbon atoms and the solvent is a phenol.

When the fluoroalkylamine contains two R substitutents on the nitrogen atom, they may be the same or different. Thus, they may both be hydrogen or they may be identical or different lower alkyl radicals or one may be hydrogen and other lower alkyl. Similarly, when r is 2 or 3, the radicals to which it relates may be identical or different.

One useful class of fluoroalkylamines falling within the scope of Formula I is the class represented by the formula:

wherein X, R and r have the meanings given above and Q is hydrogen, lower alkyl, difluoromethyl or trifluoromethyl, the fluoroalkylamine having a maximum of 6 carbon atoms.

Specific examples of fluoroalkylamine which may be used include 2,2,2-trifluoroethylamine and 2,2-difluoroethylamine and their N-methyl and N,N-dimethyl derivatives, bis(2,2,2-trifluoroethyl)amine and bis(2,2-difluoroethyl)amine and their N-methyl derivatives, tris(2,2,2-trifluoroethyl)amine, tris (2,2-difluoroethyl)amine, 2,2,2,2$^1$,2$^1$,-pentafluorodiethylamine, 3,3-difluoropropylamine, 2,2,3,3-tetrafluoropropylamine, 1-difluoromethyl-2,2-difluoroethylamine, 1-trifluoromethyl-2,2,2-trifluoroethylamine and 1-methyl-2,2-difluoroethylamine.

The fluoroalkylamines may be used singly or in the form of azeotropic or non-azeotropic mixtures. Such mixtures may be deliberately prepared in order to provide a working fluid having particular properties or they may be the total product of a manufacturing process, for example a process in which a primary amine is formed together with the corresponding secondary and tertiary amines. Suitable mixtures include mixtures of 2,2-difluoroethylamine with bis(2,2-difluoroethyl)amine and tris(2,2-trifluoroethyl)amine, mixtures of 2,2,2-trifluoroethylamine with bis(2,2,2-trifluoroethyl)amine and tris(2,2,2-trifluoroethyl)amine, and mixtures of 2,2-difluoroethylamine and 2,2,2-trifluoroethylamine. The fluoroalkylamines may also be used in admixture with other heat pump fluids.

In general, the fluoroalkylamines described herein are known compounds which may be prepared by methods fully described in the prior art.

The fluoroalkylamines described herein have boiling points at atmospheric pressure in the temperature range 35°–110° C. and are especially, though not exclusively, suitable as working fluids in heat pumps of which the primary purpose is heating of the high temperature zone rather than refrigeration of the low temperature zone, for example pumps having output temperatures in the range 45°–80° C. and maximum working pressure in the range 1.5–5 bar.

The solvents to be used with the working fluids of the invention are phenols which preferably have boiling points above 170° C. and melting points below 50° C.

Higher melting point phenols may successfully be used in the form of mixtures with one or more other phenols or other solvents such that the melting point of the mixture is below 50° C.

Particularly useful phenols are those having at least one electron-withdrawing substituent attached to the aromatic ring. In this context an electron-withdrawing substituent is defined as a substituent having a positive Hammett $\sigma$ constants and a table showing values for most common substituents is to be found in an article by Clark and Perrin in Quarterly Reviews, 18, 295–320, 1964. Examples of electron-withdrawing substituents include chloro, fluoro, nitro, cyano, trifluoromethyl, trifluoromethylsulphonyl and methylsulphonyl. As examples of specific phenols within this class, there may be mentioned m-chlorophenol, m-fluorophenol and m-trifluoromethylphenol.

Phenols not having electron-withdrawing substituents which may be used include 0-, m-, and p-cresols and mixtures thereof.

The heat pump working fluids proposed herein may be used in conjunction with suitable solvents in absorption heat pumps of conventional design. The usefulness of a material as a heat pump working fluid is usually expressed as a coefficient of performance (COP) which is the ratio of the quantity of useful heat delivered to the amount of high quality energy supplied to the generator.

In order to estimate the coefficient of performance for a fluid, the following data are required:
(i) the vapour pressure curve of the pure fluid;
(ii) the vapour pressure curve of the pure solvent;
(iii) the vapour pressure curves of a number of fluid/solvent solutions covering the upper and lower concentration limits to be found in the heat pump;
(iv) the molecular weight of the solvent;
(v) the vapour and liquid specific heats of the fluid over the temperature range to which it is to be exposed;
(vi) the liquid specific heat of the solvent, and
(vii) the liquid specific heats of the solvent/fluid solutions over the concentration range found in the pump.

The data required may be obtained experimentally and/or from published information.

The invention is illustrated but not limited by the following Examples:

EXAMPLE 1

An absorption heat pump can be constructed based on 2,2,2-trifluoroethylamine as the working fluid and m-trifluoromethylphenol as the absorbing solvent.

With component temperatures as follows:

| Evaporator | 267° K. |
|---|---|
| Absorber | 328° K. |
| Condensor | 340° K. | the coefficient of performance varies with the generator temperature as indicated below. The table also shows the mass flow rates for solvent and fluid for a heat pump with an output of 10 kw.

| Generator (°K.) | 436 | 446 | 456 | 466 |
|---|---|---|---|---|
| COP | 1.40 | 1.44 | 1.46 | 1.48 |
| Solvent (Kg/sec) | 0.177 | 0.127 | 0.103 | 0.0897 |
| Fluid (Kg/sec) | 0.0159 | 0.0159 | 0.0159 | 0.0159 |

EXAMPLE 2

An absorption heat pump can be constructed based on N,N-dimethyl-2,2,2-trifluoroethylamine as the working fluid and 3-fluorophenol as the absorbing solvent.

The coefficient of performance of such a device will be 1.34 if the temperatures in the various components have the following values.

| Evaporator | 273° K. |
|---|---|
| Absorber | 333° K. |
| Generator | 443° K. |
| Condenser | 343° K. |

This device will supply heat to circulating warm air central heating systems at 40°–45° C. For an output of 10 KW the mass flow rates of the solvent and fluid are:

| Solvent | .0647 Kg/sec | around generator/solution heat exchanger/absorber system |
|---|---|---|
| Fluid | .0143 Kg/sec | around the generator/condenser evaporator/absorber/solution heat exchanger system. |

EXAMPLE 3

An absorption heat pump can be constructed based on N,N-dimethyl-2,2,2-trifluoroethylamine as the working fluid and 3-fluorophenol as the absorbing solvent.

The coefficient of performance of such a device will be 1.39 if the temperatures in the various components have the following values.

| Evaporator | 278° K. |
|---|---|
| Absorber | 338° K. |
| Generator | 438° K. |
| Condensor | 348° K. |

This device will supply heat to circulating warm air central heating systems at 40°–45° C. For an output of 10 KW the mass flow rates of the solvent and fluid are:

| Solvent | 0.0928 Kg/sec | around generator/solution heat exchanger/absorber system |
|---|---|---|
| Fluid | 0.0156 Kg/sec | around the generator/condenser evaporator/absorber/solution heat exchanger system. |

EXAMPLE 4

An absorption heat pump can be constructed based on N,N-dimethyl-2,2,2-trifluoroethylamine as the working fluid and 3-fluorophenol as the absorbing solvent.

The coefficient of performance of such a device will be 1.41 if the temperatures in the various components have the following values.

| Evaporator | 273° K. |
|---|---|
| Absorber | 328° K. |
| Generator | 433° K. |
| Condensor | 338° K. |

This device will supply heat to circulating warm air central heating systems at 40°–45° C. For an output of 10 KW the mass flow rates of the solvent and fluid are:

| Solvent | 0.0507 Kg/sec | around generator/solution heat exchanger/absorber system |
|---|---|---|
| Fluid | 0.0147 Kg/sec | around the generator/condenser evaporator/absorber/solution heat exchanger system. |

I claim:

1. An absorption heat pump wherein the working fluid is a fluoroalkylamine of the formula:

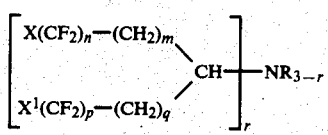

(I)

wherein each of X and $X^1$, independently, represents hydrogen or fluorine,
R represents hydrogen or a lower alkyl radical,
n represents an integer from 1 to 4, each of m and q represents an integer from 0 to 2,
p represents an integer from 0 to 4 provided that p is not zero when $X^1$ is fluorine, and
r represents an integer from 1 to 3, the fluoroalkylamine having a maximum of 6 carbon atoms
and the solvent is a phenol 2. An absorption heat pump according to claim 1 wherein the fluoroalkylamine has the formula $$(XCF_2CHQ)_rNR_{3-r}$$

wherein $X_1$ R and r have the meanings given in claim 1 and Q is hydrogen, lower alkyl, difluoromethyl or trifluoromethyl.

3. An absorption heat pump according to claim 2 wherein the fluoroalkylamine is 2,2,2-trifluoroethylamine or 2,2-difluoroethylamine or an N-methyl or N,N-dimethyl derivative of either amine.

4. An absorption heat pump according to claim 1 wherein the phenol has a boiling point above 170° C. and a melting point below 50° C.

5. An absorption heat pump according to claim 1 wherein the phenol is m-chlorophenol, m-fluorophenol or m-trifluoromethylphenol.

* * * * *